(12) United States Patent
Hirota et al.

(10) Patent No.: US 6,381,439 B2
(45) Date of Patent: Apr. 30, 2002

(54) DOCUMENT FEEDING APPARATUS AND IMAGE FORMING APPARATUS

(75) Inventors: Kazuhiro Hirota; Junichi Fujita; Satoru Endo, all of Tokyo; Kazuaki Ito, Kawagoe; Nobutaka Kato; Osamu Kato, both of Tokyo, all of (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/766,268

(22) Filed: Jan. 19, 2001

(30) Foreign Application Priority Data

Jan. 25, 2000 (JP) ........................................ 2000-016291

(51) Int. Cl.$^7$ .............................................. G03G 15/00
(52) U.S. Cl. ........................................ 399/374; 271/291
(58) Field of Search ................................. 399/361, 365, 399/367, 374; 271/3.03, 4.05, 291, 301

(56) References Cited

U.S. PATENT DOCUMENTS 5,784,680 A * 7/1998 Taruki ..................... 399/374
5,791,645 A * 8/1998 Takada ..................... 271/3.03

* cited by examiner

Primary Examiner—Arthur T. Grimley
Assistant Examiner—Hoan Tran
(74) Attorney, Agent, or Firm—Frishauf, Holtz, Goodman, Langer & Chick, P.C.

(57) ABSTRACT

An apparatus for feeding a both-sided document having images on both sides thereof is provided with a document stand; a reading section; a feeder having a feeding passage and to feed the both-sided document from the document stand to the reading section along the feeding passage; a pair of reversing rollers provided on a reversing passage to reverse the both-sided document after an image of the both-sided document is read at the reading section and to reefed the reversed both-sided document from the reversing passage to the feeding passage so that an image on another side of the both-sided document is read at the reading section; a pair of ejecting rollers provided on an ejecting passage and to eject the both-sided document to a delivery section after the images on both sides of the both-sided document are read at the reading section; and a switching mechanism to connect an outlet passage of the reading section to one of the reversing passage and the ejecting passage; wherein one of the pair of reversing rollers and one of the ejecting rollers are mounted coaxially on a shaft.

17 Claims, 8 Drawing Sheets

DOCUMENT FEEDING APPARATUS AND IMAGE FORMING APPARATUS

BACKGROUND OF THE INVENTION

This invention relates to a document feeding apparatus which enables image reading by feeding an original document in order to form an image by an image forming apparatus such as an electrophotographic copying machine, a printer, a facsimile machine, a compound machine having these plural functions, or a printing machine, and to an image forming apparatus.

Some of document feeding apparatus provided in such an image forming apparatus of a digital type separate to feed a single sheet from the other document sheets stacked on the sheet feeding tray, and are capable of reading the both sides of the document by switching over the pathway between the ejecting passage and the reversing passage.

In such a document feeding apparatus, the reversing rollers and the ejecting rollers are arranged separately in the up-and-down direction, therefore, the document feeding apparatus is made large-sized in the height direction. Further, because the switching gate for switching over the pathway between the ejecting passage and the reversing passage is disposed at the upstream side of the reversing rollers and the ejecting rollers, the document feeding apparatus is made large-sized in the width direction.

In the reversing passage, a document sheet is conveyed in direct contact with the guide ribs forming the reversing passage, therefore, the resistance to conveyance is large, and the document sheet skews, often to cause a paper jam to occur.

Further, a pair of ejecting rollers for ejecting a document sheet after being read and an ejected sheet guide member for guiding the document sheet to be ejected are provided, but the ejecting rollers and the ejection guide members are mounted separately; therefore, the document feeding apparatus is made large-sized.

SUMMARY OF THE INVENTION

This invention has been made in view of the above-mentioned points; it is an object of the invention to provide a document feeding apparatus and an image forming apparatus, which make it possible to make its size smaller by employing a part for common use to plural members and reducing the number of parts, and also make it possible to raise the document conveying ability.

In order to solve the above-mentioned problems and to accomplish the object, this invention is made to have any one of the following structures.

An apparatus for feeding a both-sided document having images on both sides thereof, comprises:
  a document stand on which the both-sided document is placed;
  a reading section at which an image of the both-sided document is read by an image reader;
  a feeder having a feeding passage and to feed the both-sided document from the document stand to the reading section along the feeding passage;
  a pair of reversing rollers provided on a reversing passage to reverse the both-sided document after an image of the both-sided document is read at the reading section and to reefed the reversed both-sided document from the reversing passage to the feeding passage so that an image on another side of the both-sided document is read at the reading section;
  a pair of ejecting rollers provided on an ejecting passage and to eject the both-sided document to a delivery section after the images on both sides of the both-sided document are read at the reading section; and
  a switching mechanism to connect an outlet passage of the reading section to one of the reversing passage and the ejecting passage;
  wherein one of the pair of reversing rollers and one of the ejecting rollers are mounted coaxially on a shaft.

An image forming apparatus, comprises:
  an image reader to read an image on a document;
  a recording device to record an image on a recording sheet based on the image read by the image reader; and
  a document conveying device to convey a both-sided document to the image reader in such a way that images on the both-sided document are read by the image reader,
  the document conveying device comprising
    a document stand on which the both-sided document is placed;
    a reading section at which an image of the both-sided document is read by the image reader;
    a feeder having a feeding passage and to feed the both-sided document from the document stand to the reading section along the feeding passage;
    a pair of reversing rollers provided on a reversing passage to reverse the both-sided document after an image of the both-sided document is read at the reading section and to reefed the reversed both-sided document from the reversing passage to the feeding passage so that an image on another side of the both-sided document is read at the reading section;
    a pair of ejecting rollers provided on an ejecting passage and to eject the both-sided document to a delivery section after the images on both sides of the both-sided document are read at the reading section; and
    a switching mechanism to connect an outlet passage of the reading section to one of the reversing passage and the ejecting passage;
  wherein one of the pair of reversing rollers and one of the ejecting rollers are mounted coaxially on a shaft.

Further, the above object may be attained by the following preferable structures.

(1) A document feeding apparatus, which separates to feed a single sheet from the other document sheets stacked on a sheet feeding tray (document stand) and are capable of reading the both sides of a document sheet, comprising
  a document reading section arranged in the lower part and a reversing passage and a pair of reversing rollers for reading the both sides of the document sheet arranged in the upper part,
  an ejecting passage and a pair of ejecting rollers arranged at the downstream side of said document reading section, and
  a switching gate for switching over the pathway from said document reading section between said reversing passage and said ejecting passage, wherein
    the driven one of said pair of reversing rollers and the driving one of said pair of ejecting rollers are arranged on the same shaft.

According to the invention described in the structure (1), the driven one of the pair of reversing rollers and the driving one of the pair of ejecting rollers are disposed on the same shaft; therefore, the number of parts is made smaller, and it is possible to make the size in the height direction smaller.

(2) A document feeding apparatus as set forth in the structure (1), wherein the supporting point (fulcrum) of the aforesaid switching gate is provided on the aforesaid shaft.

According to the invention described in the structure (2), the supporting point of the switching gate is provided on the shaft on which the driven one of the pair of reversing rollers and the driving one of the pair of ejecting rollers are provided; therefore, the number of parts is made smaller, and it is possible to make smaller the size in the width direction, on top of the height direction.

(3) A document feeding apparatus, which separates to feed a single sheet from the other document sheets stacked on a sheet feeding tray, is provided with a reversing passage for reading the both sides of a document sheet, and are capable of reading the both sides of the document sheet, wherein a conveyance-resistance reducing rolling bar for reducing the resistance to conveyance of a document sheet is attached in said reversing passage.

According to the invention described in the structure (3), the resistance to conveyance of a document sheet in the reversing passage can be reduced by the conveyance-resistance reducing rolling bar; therefore, the conveying ability for a document is improved, and it becomes possible to reduce the frequency of the occurrence of a paper jam.

(4) A document feeding apparatus as set forth in the structure (3), wherein the aforesaid reversing passage bends in the shape of S, and at least in a part of the bending portions (curved bent portions), the aforesaid conveyance-resistance reducing rolling bar is disposed.

According to the invention described in the structure (4), the reversing passage is s-shaped, and the conveyance-resistance reducing rolling bar is disposed in the bending portion; therefore, the apparatus is made compact, and the document conveying ability in the bending portion is improved, to make it possible to reduce the frequency of the occurrence of a paper jam.

(5) A document feeding apparatus as set forth in the structure (3) or (4), wherein a plurality of the aforesaid conveyance-resistance reducing rolling bars are provided between the guide ribs forming the aforesaid reversing passage.

According to the invention described in the structure (5), a plurality of the aforesaid conveyance-resistance reducing rolling bars are provided between the guide ribs forming the aforesaid reversing passage; therefore, the apparatus is made compact, and the document conveying ability is improved, to make it possible to reduce the frequency of the occurrence of a paper jam.

(6) A document feeding apparatus as set forth in any one of the structures (3) to (5), wherein the aforesaid conveyance-resistance reducing rolling bar is provided in such a way that only a part of it is projected out of the aforesaid guide ribs toward the reversing passage in order that a document sheet may hit a portion of the rolling bar deviated to the sheet passing side from the central line.

According to the invention described in the structure (6), the conveyance-resistance reducing rolling bar is provided in such a way that only a part of it is projected out of the guide ribs toward the reversing passage side and a document sheet hits a portion of the rolling bar deviated to the sheet passing side from the central line; therefore, the apparatus is made compact, and the document conveying ability is improved.

(7) A document feeding apparatus, which separates to feed a single sheet from the other document sheets stacked on a sheet feeding tray and are capable of reading the both sides of a document sheet, comprising a pair of outlet rollers for ejecting said document sheet after said document sheet is read and an outlet guide member for guiding a document sheet to be ejected, wherein the shaft of one of said pair of outlet rollers is used also as the mounting portion for said outlet guide member.

According to the invention described in the structure (7), the shaft of one of the pair of outlet rollers is used also as the mounting portion for the outlet guide member; therefore, the number of parts is made smaller, and it is possible to make the size smaller.

(8) A document feeding apparatus as set forth in the structure (7), wherein the driving one and the driven one of the aforesaid pair of outlet rollers are pressed to each other by a ring-shaped spring.

According to the invention described in the structure (8), the driving one and the driven one of the aforesaid pair of outlet rollers are pressed to each other by a ring-shaped spring; therefore, the pair of ejecting rollers are made to form a compact unit.

(9) An image forming apparatus provided with a document feeding apparatus as set forth in any one of the structures (1) to (8).

According to the invention described in the structure (9), the image forming apparatus can be provided with a document feeding apparatus, which makes it possible to make its size smaller by employing a part for common use to plural members and reducing the number of parts, and also make it possible to raise the document conveying ability.

DETAILED DESCRIPTION OF THE PREFERRED EMBODIMENT

In the following, an embodiment of an image forming apparatus provided with a document feeding apparatus of this invention will be explained on the basis of the drawings; however, this invention is not to be limited to this embodiment.

Figure 1:
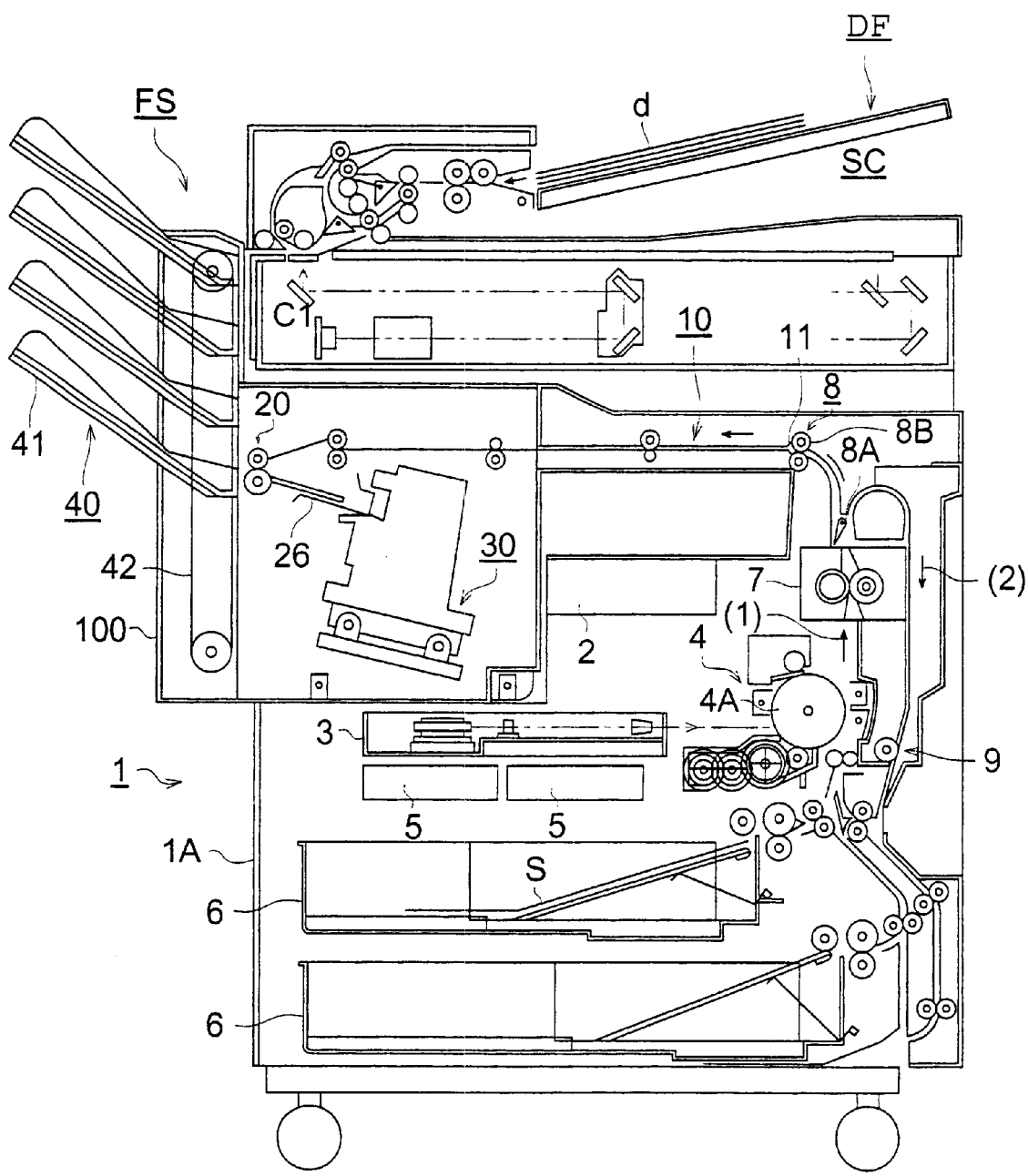
FIG. 1 is a drawing showing the overall structure of an image forming apparatus provided with a print sheet finishing apparatus, a document feeding apparatus, and an image reading apparatus.

FIG. 1 is a drawing showing the overall structure of the image forming apparatus 1 equipped with the print sheet finishing apparatus FS, the document feeding apparatus DF, and the image reading apparatus (scanner) SC.

The image forming apparatus mainframe 1A shown in the drawing is provided with the image processing section 2, the image writing section 3, the image forming section 4, the high-voltage power source section 5, the cassette sheet feeding section 6, the fixing section 7, the sheet ejection section 8, and the re-conveyance means (ADU) 9 for automatic duplex copying.

On the upper side of the image forming apparatus mainframe 1A, the image reading apparatus SC and the document feeding apparatus DF are installed. To the upper left side, the side of the sheet ejection section 8, of the image forming apparatus mainframe 1A, the print sheet finishing apparatus FS is connected.

The document sheet d, which is set on the document base of the document feeding apparatus DF with the first side made to face up, is conveyed to the direction of the arrow mark, and the image of the one or both sides of the document is read by the CCD image sensor C1 through the optical system of the image reading apparatus SC.

The analogue signal obtained by the photoelectric conversion by the CCD image sensor C1 is subjected to analogue processing, A/D conversion, shading correction, image compression processing, etc., and then it is transmitted to the image writing section 3.

In the image writing section 3, the output light beam from a semiconductor laser is applied to the photoreceptor drum 4A of the image forming section 4, to form a latent image. In the image forming section 4, the processes such as charging, exposure, development, transfer, detachment, and cleaning are carried out, and the image is transferred to the paper sheet S, which has been conveyed from the cassette sheet feeding section 6. The paper sheet S carrying an image is subjected to fixing in the fixing apparatus 7, and is conveyed from the sheet ejection section 8 to the print sheet finishing apparatus FS. In other way, the paper sheet S having an image on one side processed, which has been fed to the re-conveyance means 9 by the ejecting passage switching plate 8A, is subjected to duplex image processing in the image forming section 4 again, and then, it is fed to the print sheet finishing apparatus FS by the ejecting rollers 8B of the sheet ejection section 8.

The print sheet finishing apparatus FS is mounted to the upper left portion of the image forming apparatus mainframe 1A in a manner capable of being mounted and dismounted. The print sheet finishing apparatus FS is composed of the sheet conveyance means 10, the sheet ejection means 20, the after-print processing means 30, and the up-and-down moving ejection means 40, which are arranged in the print sheet finishing apparatus mainframe 100.

In FIG. 1, in the right side inside the image forming apparatus mainframe 1A, with respect to the image forming section 4 positioned at the center, in the lower part of the image forming apparatus mainframe 1A in the height direction, there is provided the cassette sheet feeding section 6, and in the upper part of it, there are provided the fixing apparatus 7 and the sheet ejection section 8. By this structure of vertical arrangement, the sheet conveying passage (1) in the almost vertical direction is formed. The paper sheet S, which has been conveyed out from the cassette sheet feeding section 6, is conveyed along this upward-directing sheet conveying passage and ejected to the outside of the image forming apparatus mainframe 1A.

Approximately parallel to this sheet conveying passage (1) in the vertical direction, the sheet conveying passage (2) by the re-conveyance means 9 is formed.

By forming the above-mentioned sheet conveying passages (1) and (2) in the vertical direction, a sheet conveying passage having the shortest length from the cassette sheet feeding section 6 to the sheet ejection section 8 is made up.

The sheet conveyance means 10 of the print sheet finishing apparatus FS is contained in the space portion above the image forming apparatus mainframe 1A as shown in the drawing. The sheet entrance portion 11 of the sheet conveyance means 10 is adjacent to the ejecting rollers 8B of the sheet ejection section 8 of the image forming apparatus mainframe 1A. Further, in this state of mounting, in the space portion at the upper left part of the image forming apparatus mainframe 1A shown in the drawing, the sheet ejection means 20 and the after-print processing means 30 of the print sheet finishing apparatus SF are contained. The up-and-down moving ejection means 40 composed of the plural trays for ejected sheets (also called bins) 41 and the up-and-down movement driving means 42 is located at the left side of the after-print processing means 30 shown in the drawing.

Figure 2:
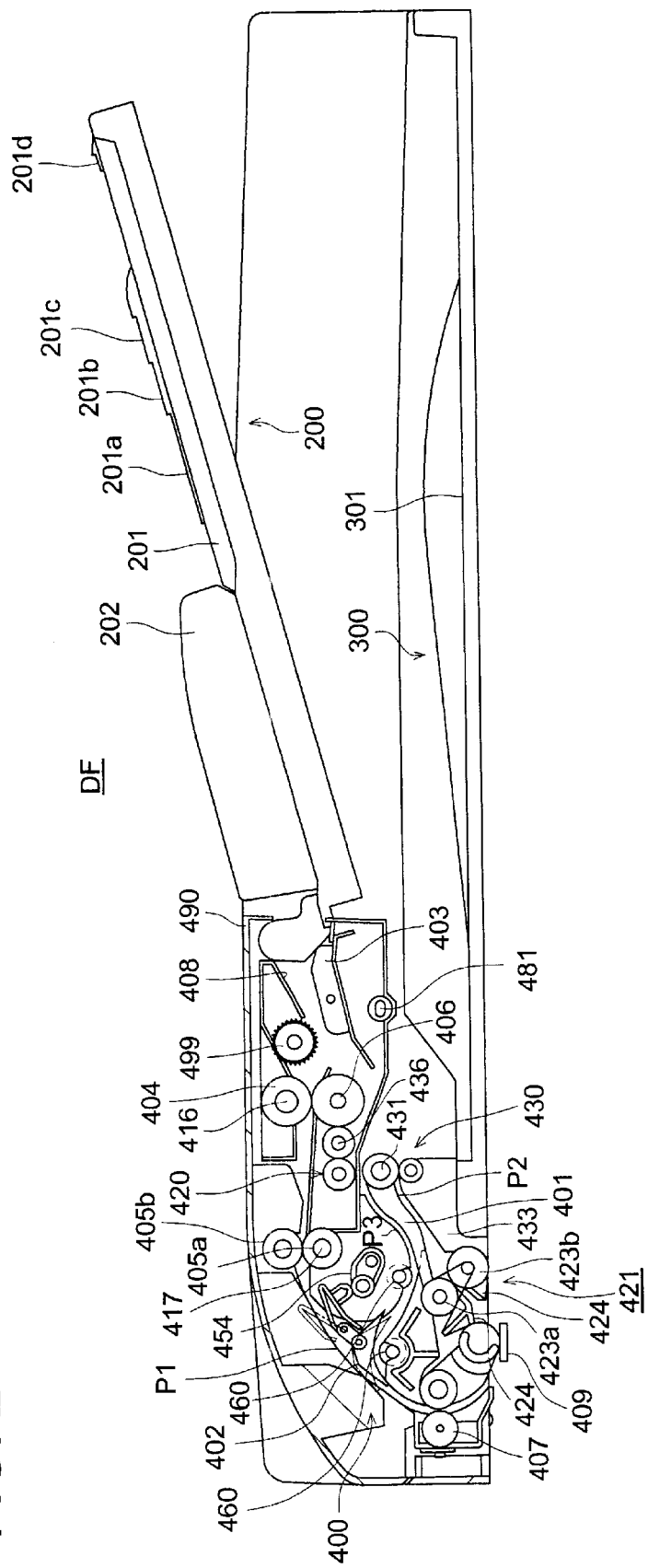
FIG. 2 is a cross-sectional view of a document feeding apparatus.
Figure 3:
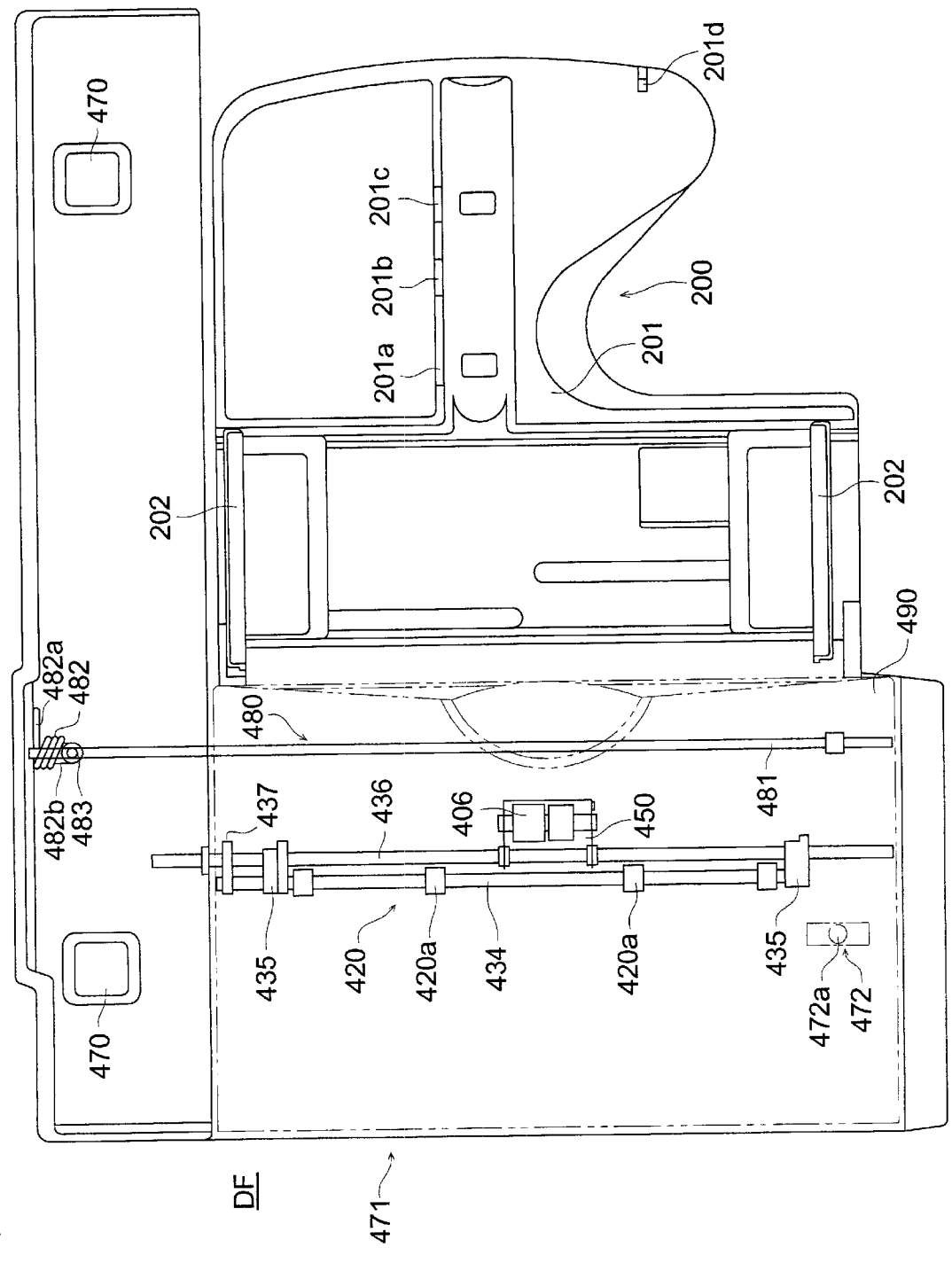
FIG. 3 is the plan of a document feeding apparatus.
Figure 4:
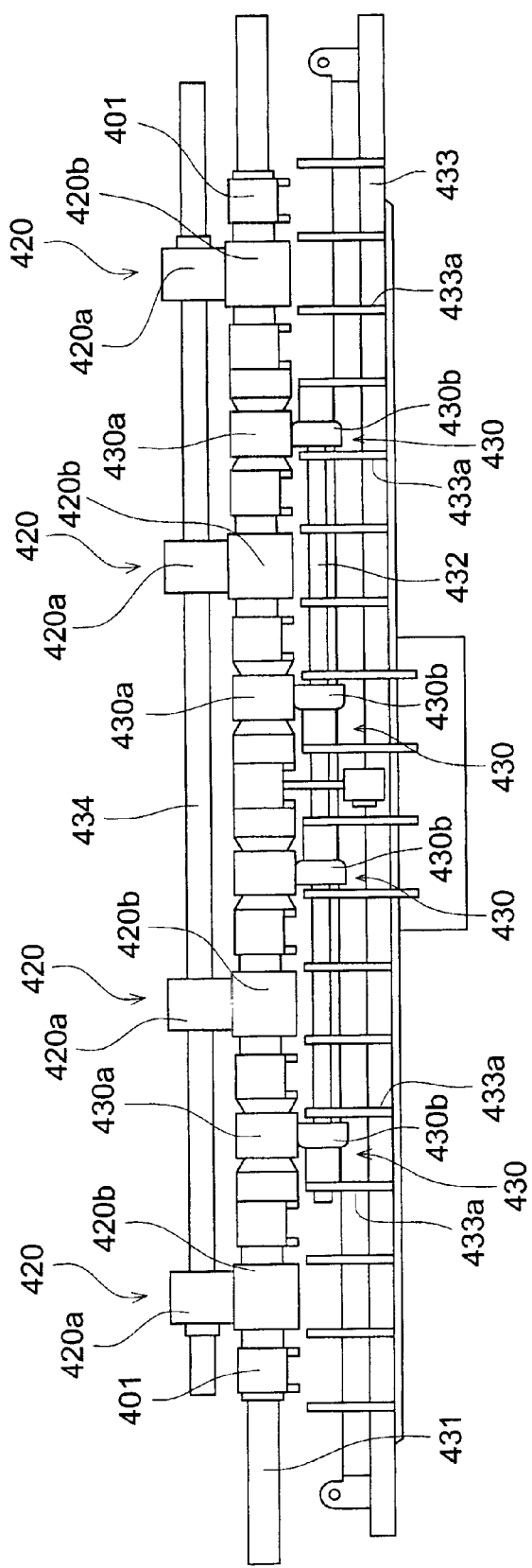
FIG. 4 is the front view of the reversing-ejecting unit.
Figure 5:
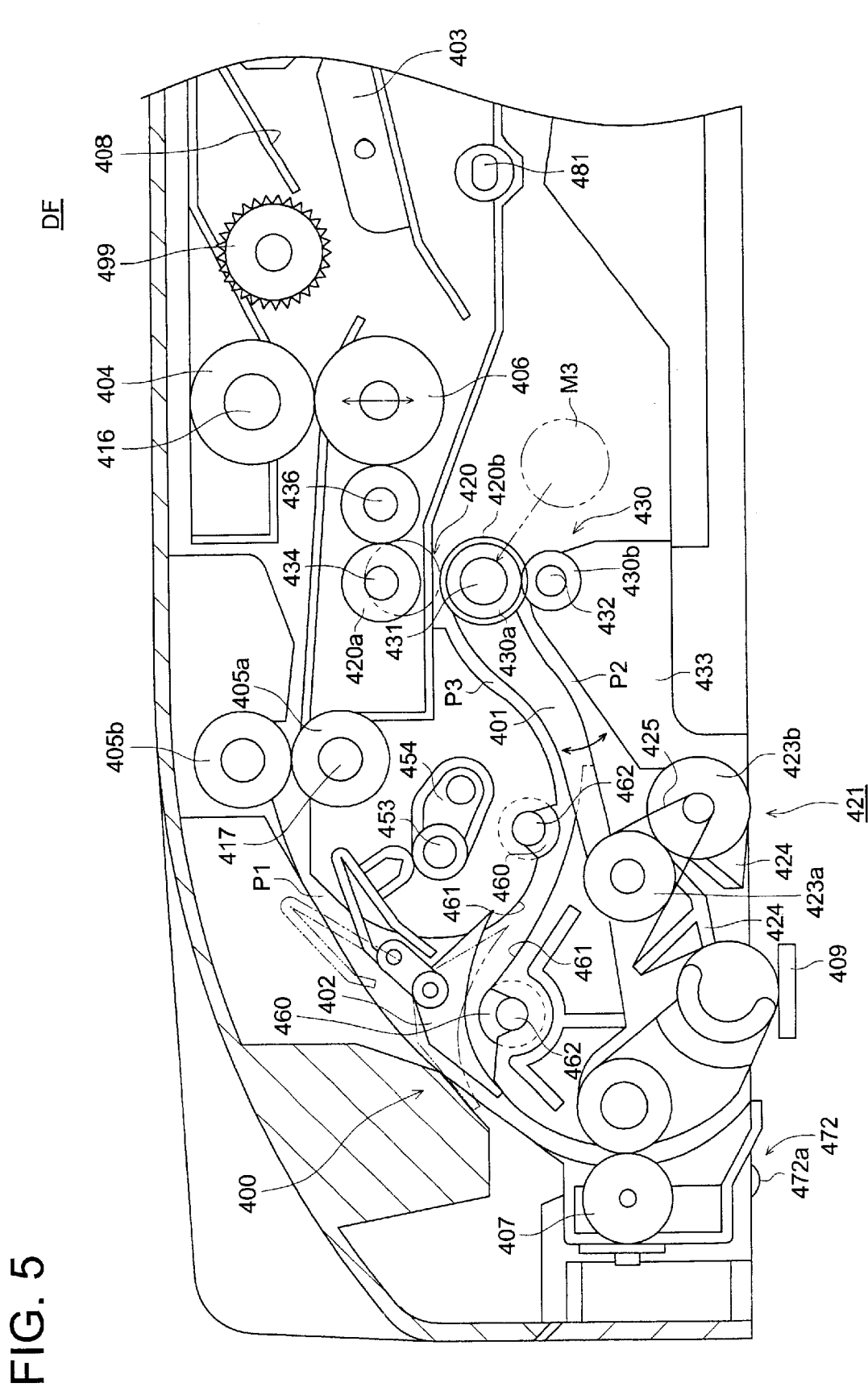
FIG. 5 is an enlarged cross-sectional view of the conveyance section.
Figure 6:
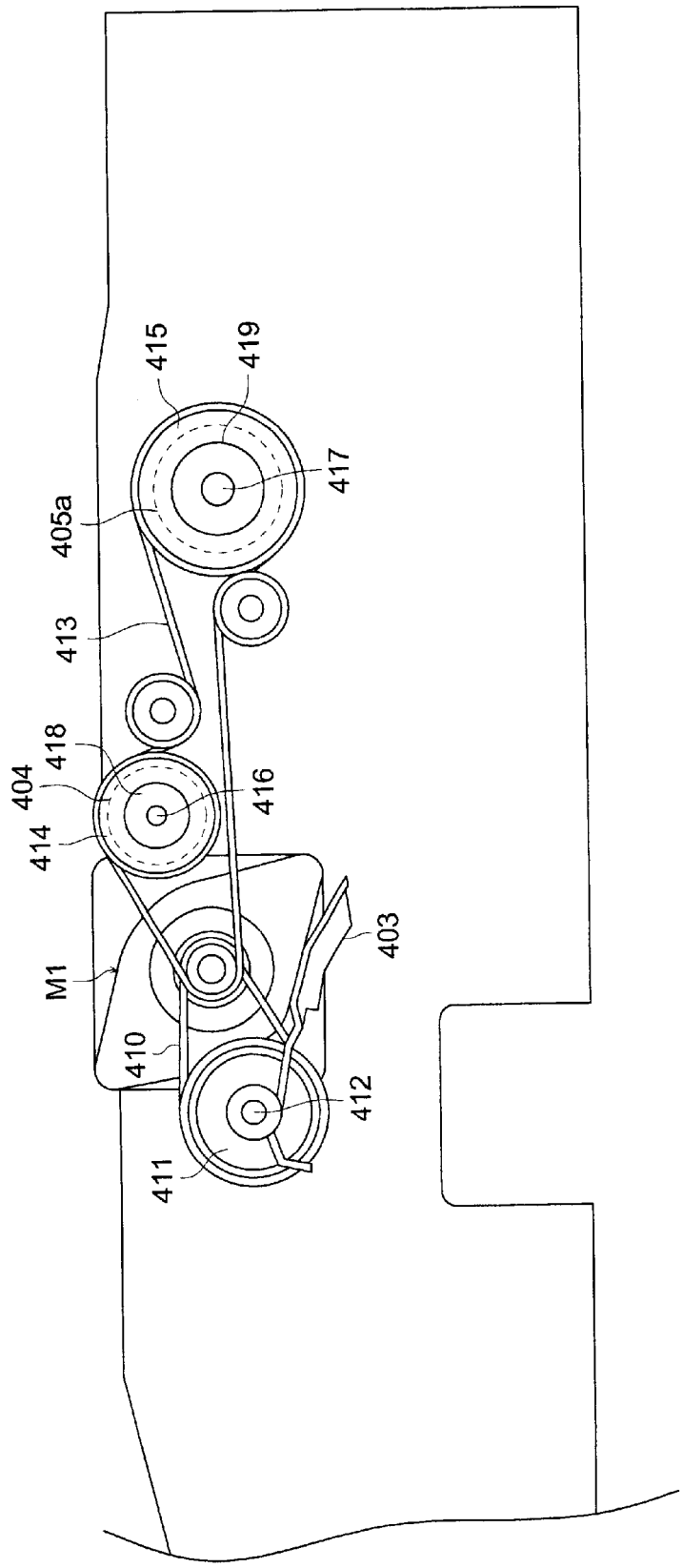
FIG. 6 is the rear view of the paper feed driving motor section.
Figure 7:
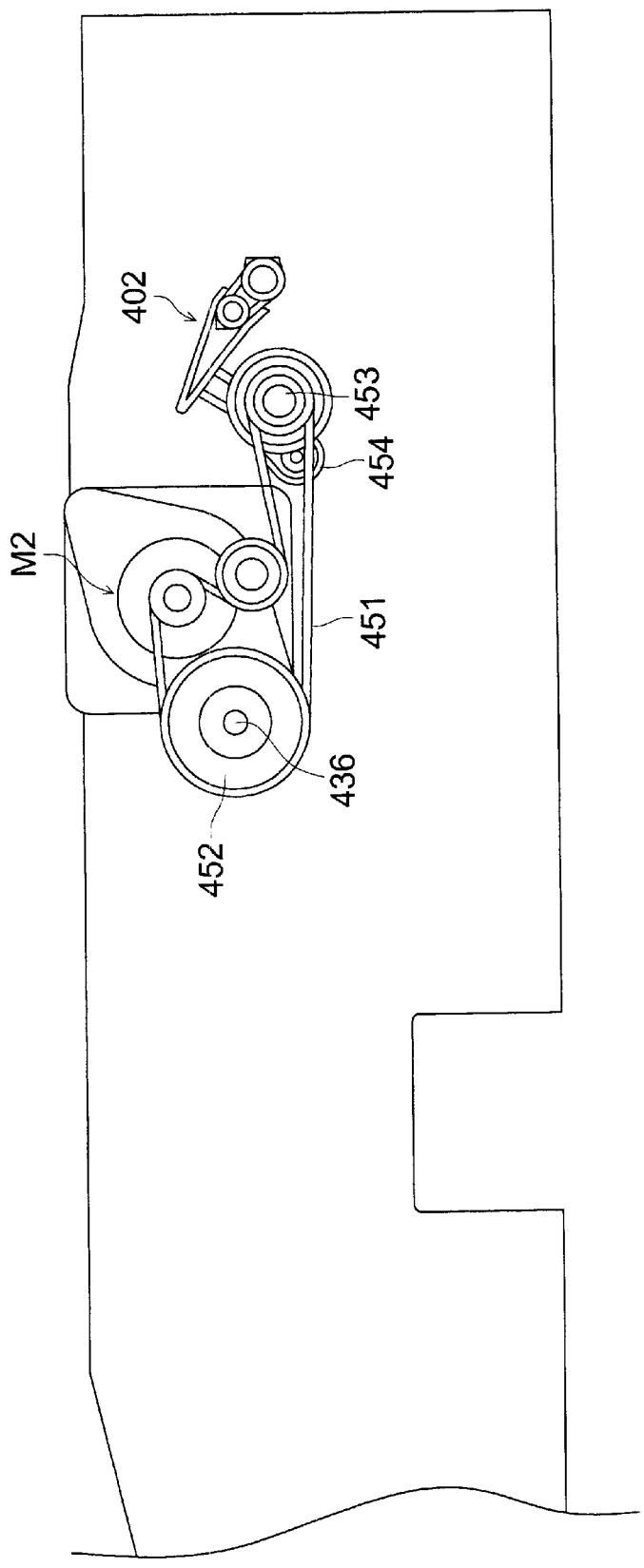
FIG. 7 is the rear view of the reversible driving motor section.
Figure 8:
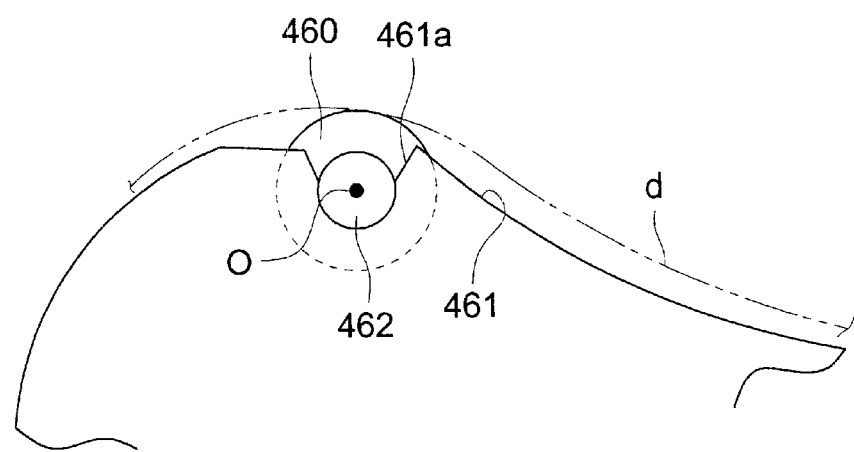
FIG. 8 is an enlarged drawing of the reversing passage.
Figure 9:
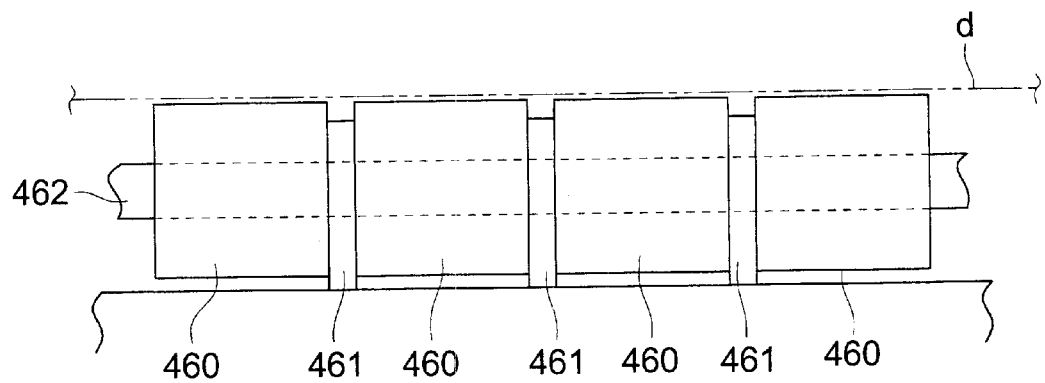
FIG. 9 is the front view of the conveyance-resistance reducing rolling bars.

In the following, the document feeding apparatus will be explained on the basis of FIG. 2 to FIG. 8. FIG. 2 is a cross-sectional view of the document feeding apparatus, FIG. 3 is the plan of the document feeding apparatus, FIG. 4 is the front view of the reversing-ejection unit, FIG. 5 is an enlarged cross-sectional view of the conveyance section, FIG. 6 is the rear view of the sheet feed driving motor section, FIG. 7 is the rear view of the reversible driving motor section, FIG. 8 is an enlarged drawing of the reversing passage, and FIG. 9 is the front view of the conveyance-resistance reducing rolling bars.

In the document feeding apparatus DF, the document feeding section 200, the ejection section 300, and the conveyance section 400 are arranged.

The document feeding section 200 comprises the sheet feeding tray 201, on which a plurality of sheets of a document can be set, and in this sheet feeding tray 201, a pair of regulation plates 202 for positioning document sheets in the width direction are provided in such a manner as to be able to move in the width direction. Further, in the sheet feeding tray 201, a plurality of rib-shaped projections 201a, 201b, 201c, and 201d are provided respectively at the positions with a short distance from the positions where the trailing edges of the document sheets of the pertinent sizes come, to prevent that a document sheet is made to move back to the upstream direction by stopping the sheet at the time of feeding.

The ejection section 300 comprises the output tray 301, and this output tray 301 is disposed at the position under the document feeding section 200. Onto the output tray 301, it is ejected the document sheet having been conveyed by the conveyance section 400 in such a way that the one side or the both sides are read.

In the conveyance section 400, there are provided the feeding passage P1, the ejecting passage P2, and the reversing passage P3; the switching-over between the ejecting passage P2 and the reversing passage P3 is carried out by the switching gate 401, and the switching-over between the feeding passage P1 and the reversing passage P3 is carried out by the switching gate 402. Here, the switching gate 401 can swing as indicated with an arrow mark around the shaft 431 so that the switching gate 401 can lead the document from a document reading section 409 to one of the reversing passage P3 and the ejecting passage P2. In the case where only one side of an original document is read, the document sheet fed from the document feeding section 200 passes the feeding passage P1 and is ejected to the ejection section 300 through the ejecting passage P2 which is switched over by the switching gate 401.

Further, in the case where both sides of an original document are read, the document sheet fed from the document feeding section 200 is conveyed once from the feeding passage P1 to the reversing passage P3 to reverse the document sheet, wherein the pathway is switched over to the reversing passage P3 by the switching gate 402, and the reversed document sheet is conveyed again to the feeding passage P1 to which the pathway is switched over by the switching gate 402; then the first side of the document sheet is read at the document reading section 409. After the first side of the document sheet is read, the document sheet is led to the reversing passage P3 to which the pathway is switched over by the switching gate 401. When the document sheet is fed again from the reversing passage P3 to the feeding passage P1, the document sheet is reversed. Then, the second side of the document is read at the document reading section 409. Thereafter, the document sheet is ejected to the ejection section 300 by the switching gate 402 through the ejecting passage P2.

In the feeding section, the movable pressing plate 403, the pickup roller 499, the feeding roller 404, the double-feed preventing roller 406, the driving registration roller 405a, and the driven registration roller 405b are arranged. The movable pressing plate 403 is moved upward to press the document sheets to the pickup roller 499 when the document is fed, and the pickup roller 499 leads the top sheet to the feeding roller 404; thus, the document sheets are fed one by one by the feeding roller 404 and the double-feed preventing roller 406. This document sheet is conveyed by the driving of the feeding roller 404 to the driving registration roller 405a and the driven registration roller 405b, the skew of the fed sheet is corrected by the driving registration roller 405a and the driven registration roller 405b, the timing is adjusted by the retard roller 407, and the document sheet is fed to the document reading section 409.

As shown in FIG. 6, the movable pressing plate 403, the feeding roller 404, and the driving registration roller 405a are driven by the sheet feed driving motor M1, and by the rotation of this motor M1, the torque limiter 411 is driven through the belt 410; the up-and-down movement driving shaft 412 of this torque limiter 411 is rotated to make the movable pressing plate 403 move upward, and the up-and-down movement driving shaft 412 acts as the supporting point for the movable pressing plate 403 to move up and down. By the rotation of this sheet feed driving motor M1, the pulleys 414 and 415 of the feeding roller 404 and the driving registration roller 405a are rotated through the belt 413; however, because the one-way clutches 418 and 419 are provided at the roller shafts 416 and 417 of the feeding roller 404 and the driving registration roller 405a respectively, when the sheet feed motor M1 rotates in the direction to make the movable pressing plate 403 move upward, it is prevented the reverse rotation to the feeding direction of the feeding roller 404 and the driving registration roller 405a. By the reverse rotation of the sheet feed driving motor M1, the pulleys 414 and 415 of the feeding roller 404 and the driving registration roller 405a are rotated through the belt 413, to rotate the feeding roller 404 and the driving registration roller 405a.

The document reading section 409 is located at the lower side, and the reversing passage P3 and the pair of reversing rollers 420 for reading both sides of a document, and the pair of ejecting rollers 430 are arranged in the middle part of the conveyance section 400. Further, at the downstream side of the document reading section 409, the ejecting passage P2 and the outlet roller unit 421 are disposed, in which the switching gate 401 for switching over the pathway from the document reading section 409 between the ejecting passage P2 and the reversing passage P3 is disposed.

The outlet roller unit 421 comprises the pair of outlet rollers 423 and the outlet guide members 424. The pair of outlet rollers 423 comprise the driving one 423a and the driven one 423b, and the shafts are used also for the mounting of the outlet guide members 424, which reduces the number of parts and makes it possible to make the apparatus small-sized. Further, the driving one and the driven one of the pair of outlet rollers 423 are pressed to each other by the ring-shaped spring 425, which makes it possible to make the pair of outlet rollers 423 a compact unit.

The pair of reversing rollers 420 comprises the driving one 420a and the driven one 420b, and the pair of ejecting rollers also comprise the driving one 430a and the driven one 430b. The driven one 420b of the pair of reversing rollers 420 and the driving one 430a of the pair of ejecting rollers 430 are arranged on the same shaft 431, and the driven one 420b is mounted rotatably around the common shaft 431. Further, the supporting point (fulcrum) of the switching gate is also provided on the common shaft 431, which makes the number of parts small.

The driven one 430b of the pair of ejecting rollers 430 is provided rotatably around the shaft 432 as shown in FIG. 4 and FIG. 5, this shaft 432 being supported by the ejection guide member 433, and is disposed in the ribs 433a of the ejection guide member 433. The driving one 420a of the pair of reversing rollers 420 is mounted on the shaft 434.

As shown in FIG. 3 and FIG. 5, the shaft 434 is supported by the shaft 436 through the supporting members 435, and the shaft 436 is rotated in the forward and reverse direction by the reversible driving motor M2 shown in FIG. 7. The shaft 436 and the shaft 434 is connected by the drive belt 437, and the rotating force of the shaft 436 is transmitted to the shaft 434 through the belt 437 to rotate it in the forward and reverse direction.

The pair of reversing rollers 420 and the pair of ejecting rollers 430 are arranged in the vertical direction, which makes the apparatus small-sized in the height direction, and the supporting point (fulcrum) of the switching gate 401 is provided on the common shaft 431, which makes the apparatus small-sized in the width direction.

Further, by the shaft 436, the double-feed preventing roller 406, which is provided to its right, is supported through the stay member 450, and the supporting point of the driving side is also the supporting point of the double-feed preventing roller 406, which makes it unnecessary to provide two shafts as the shaft 436 for the supporting point of the two rollers and makes it possible to reduce the size.

As shown in FIG. 7, regarding the reversing rollers 420 and the switching gate 402, the normal rotation of the reversible driving motor M2 rotates the pulley 452 through the belt 451, and rotates the shaft 436. Linked to this motion, the cam shaft 453 of the switching gate 402 is rotated, and the switching gate 402 is made to operate by the cam 454, to switch over the pathway to the reversing passage P3. The reverse rotation of the reversible driving motor M2 rotates the shaft 436 in the reverse direction through the belt 451, and linked to this motion, the cam shaft 453 of the switching gate 402 is rotated reversely, and the switching gate 402 is made to operate by the cam 454, to switch over the pathway to the feeding passage P1.

At the time of ejection, by-the driving of the reading motor M3 shown by the double dot and dash line in FIG. 5, the driving one 430a of the pair of ejecting rollers 430 is rotated, and a document sheet is ejected by the rotation of the driving one 430a and the driven one 430b in the direction of ejection.

At the time of reversing, the rotation of the shaft 436 is transmitted to the shaft 434 through the belt 437, and it is further transmitted from the driving one of the pair 420a of reversing rollers 420 to its driven one 420b, to convey out a document sheet by the driving one 420a and the driven one 420b; next, the reverse rotation of the shaft 436 is transmitted to the shaft 434 through the belt 437, and the reverse rotation is further transmitted from the driving one 420a of the pair of reversing rollers 420 to the driven one 420b, to reverse the document and return the document sheet to the feeding passage P1 by the driving one 420a and the driven one 420b.

In the reversing passage P3, the conveyance-resistance reducing rolling bars 460 for reducing the resistance to conveyance of a document sheet are mounted; in this embodiment, the reversing passage P3 bends in S-shape, and in these two bending portions (two curved bent sections), the conveyance-resistance reducing rolling bars 460 are arranged. These plural conveyance-resistance reducing rolling bars 460 are provided rotatably on the shaft 462 between the guide ribs 461 forming the reversing passage P3 as shown in FIG. 9.

As shown in FIG. 8, regarding the conveyance-resistance reducing rolling bars 460, the shaft 461 is disposed in the concave portion 461a of the guide ribs 461 in order that the document sheet d may hit the portion of the rolling bars deviated to the sheet passing side from the central line O of the rolling bars, that is, the conveyance-resistance reducing rolling bars 460 are provided in a manner such that only a part of them is projected out of the guide ribs 461 toward the reversing passage.

As described in the above, only a part of the conveyance-resistance reducing rolling bars 460 is projected out of the guide ribs 461 toward the reversing passage, and a document sheet hits the portion of the rolling bars deviated to the sheet passing side from the central line O of the rolling bars; therefore, the apparatus is made compact, and the document conveying ability is improved, which makes it possible to reduce the frequency of the occurrence of a paper jam. Further, the reversing passage P3 is S-shaped, and the conveyance-resistance reducing rolling bars 460 are disposed in each of the bending portions; therefore, the apparatus is made compact, and on top of it, the document conveying ability in the bending portions is made higher.

Further, in the document feeding apparatus DF of this embodiment, as shown in FIG. 3, the hinges 470 are provided at the deep side; the document feeding apparatus DF is of such a type as to be opened from the image forming apparatus mainframe 1A, by lifting upward the front side of the main body 471 of the document feeding apparatus.

Near the front side of the document reading section 409, the bumping member 472, which bumps against the image forming apparatus mainframe 1A at a point, is provided, and in order to apply a force in the direction to lift up the main body 471 of the document feeding apparatus, the mechanism 480 for applying a rotational force by torsion acting upward against the weight of the main body 471 itself is provided.

The up-lifting mechanism 480 is composed of the shaft 481 for applying the rotational force arranged in such a manner as to extend from the deep side of the main body 471 of the document feeding apparatus to the front side, and the resilient member 482 arranged at the deep side of the main body 471 of the document feeding apparatus for giving the shaft 481 a rotational force to lift up the main body 471. The resilient member 482 is made up of a coil spring, and the one end 482a is fixed to the main body 471 of the document feeding apparatus and the other end 482b is fixed to the shaft 481 for applying the rotational force by the screw 483, to give the shaft 481 a force for lifting up the main body 471 by torsion.

As described in the above, the transmission of force is carried out by the shaft 481 for applying a rotational force, and owing to the simple mechanism for lifting up composed of the shaft 481 for applying a rotational force and the resilient member 482 for giving the shaft 481 a force to lift up the main body by torsion, the falling down by the self-weight of the main body 471 of the document feeding apparatus is prevented.

As described in the above, when the main body 471 of the document feeding apparatus is closed, only the bumping member 472 bumps the image forming apparatus mainframe 1A at a point near the front side of the document reading section 409, and the falling down by the self-weight of the main body 471 of the document feeding apparatus is prevented by the force to lift it up; therefore, [it is possible to make the main body 471 brought into contact with a point near the front side of the document reading section reliably without adjustment], the ease of operation is good, and the document conveying ability of is made higher.

Further, in this embodiment of the invention, a document feeding apparatus connected to a copying machine is shown, but this invention can be applied to a document feeding apparatus to be used by being connected to an image forming apparatus such as a printer, or a facsimile machine, a compound machine having these plural functions, or a light-duty printing machine.

As described in the foregoing, according to a document feeding apparatus of this invention, it is achieved to employ a part common to a plurality of members to reduce the number of parts, it is possible to make the apparatus small-sized, and also it is possible to make the document conveying ability higher.

Further, owing to the above-mentioned document feeding apparatus, for an image forming apparatus, it is achieved to employ a part common to a plurality of members to reduce the number of parts, it is possible to make the apparatus small-sized, and also it is possible to make the document conveying ability higher.

What is claimed is:

1. An apparatus for feeding a both-sided document having images on both sides thereof, comprising:

a document stand on which the both-sided document is placed;

a reading section at which an image of the both-sided document is read by an image reader;

a feeder having a feeding passage and to feed the both-sided document from the document stand to the reading section along the feeding passage;

a pair of reversing rollers provided on a reversing passage to reverse the both-sided document after an image of the both-sided document is read at the reading section and to refeed the reversed both-sided document from the reversing passage to the feeding passage so that an image on another side of the both-sided document is read at the reading section;

a pair of ejecting rollers provided on an ejecting passage and to eject the both-sided document to a delivery section after the images on both sides of the both-sided document are read at the reading section; and a switching mechanism to connect an outlet passage of the reading section to one of the reversing passage and the ejecting passage;

wherein one of the pair of reversing rollers and one of the ejecting rollers are mounted coaxially on a shaft.

2. The apparatus of claim 1, wherein the pair of reversing rollers comprises a reversing driving-roller and a reversing driven-roller and the pair of ejecting rollers comprises an ejecting driving-roller and an ejecting driven-roller, and wherein one of the reversing driving-roller and the ejecting driving-roller and one of the reversing driven-roller and the ejecting driven-roller are mounted coaxially on the shaft.

3. The apparatus of claim 2, wherein the ejecting driving-roller and the reversing driven-roller are mounted coaxially on the shaft.

4. The apparatus of claim 1, wherein the switching mechanism comprises a switching gate swinging around a fulcrum thereof and the fulcrum of the switching gate provided coaxially on the shaft.

5. The apparatus of claim 1, further comprising:
a pair of reading section outlet rollers provided between the reading section and the switching mechanism, the pair of reading section outlet rollers including an outlet upper roller and an outlet lower roller;
an upper guide provided to the outlet upper roller; and
an lower guide provide to the outlet lower roller;
wherein the upper guide and the lower guide leads the both-sided document from the reading section to the switching mechanism.

6. The apparatus of claim 5, wherein the outlet upper roller and the outlet lower roller are brought in pressure contact with each other by a ring-shaped spring.

7. The apparatus of claim 1, wherein the reversing passage comprises a curved bent section having a curved concave section and a fixed guide member provided at the curved concave portion of the curved bent section.

8. The apparatus of claim 1, wherein the reversing passage comprises a curved bent section having a curved convex portion and a roller provided at the curved convex portion of the curved bent section.

9. An image forming apparatus, comprising:
an image reader to read an image on a document;
a recording device to record an image on a recording sheet based on the image read by the image reader; and
a document conveying device to convey a both-sided document to the image reader in such a way that images on the both-sided document are read by the image reader,
the document conveying device comprising
document stand on which the both-sided document is placed;
a reading section at which an image of the both-sided document is read by the image reader;
a feeder having a feeding passage and to feed the both-sided document from the document stand to the reading section along the feeding passage;
a pair of reversing rollers provided on a reversing passage to reverse the both-sided document after an image of the both-sided document is read at the reading section and to refeed the reversed both-sided document from the reversing passage to the feeding passage so that an image on another side of the both-sided document is read at the reading section;
a pair of ejecting rollers provided on an ejecting passage and to eject the both-sided document to a delivery section after the images on both sides of the both-sided document are read at the reading section; and
a switching mechanism to connect an outlet passage of the reading section to one of the reversing passage and the ejecting passage;
wherein one of the pair of reversing rollers and one of the ejecting rollers are mounted coaxially on a shaft.

10. The image forming apparatus of claim 9, wherein the pair of reversing rollers comprises a reversing driving-roller and a reversing driven-roller and the pair of ejecting rollers comprises an ejecting driving-roller and an ejecting driven-roller, and
wherein one of the reversing driving-roller and the ejecting driving-roller and one of the reversing driven-roller and the ejecting driven-roller are mounted coaxially on the shaft.

11. The image forming apparatus of claim 10, wherein the ejecting driving-roller and the reversing driven-roller are mounted coaxially on the shaft.

12. The image forming apparatus of claim 9, wherein the image reader comprises an optical system fixed to be stationary so that the image of the both-sided document is read though the optical system while the both-sided document is fed by the feeder.

13. The apparatus of claim 9, wherein the switching mechanism comprises a switching gate swinging around a fulcrum thereof and the fulcrum of the switching gate provided coaxially on the shaft.

14. The apparatus of claim 9, further comprising:
a pair of reading section outlet rollers provided between the reading section and the switching mechanism, the pair of reading section outlet rollers including an outlet upper roller and an outlet lower roller;
an upper guide provided to the outlet upper roller; and
an lower guide provide to the outlet lower roller;
wherein the upper guide and the lower guide leads the both-sided document from the reading section to the switching mechanism.

15. The apparatus of claim 14, wherein the outlet upper roller and the outlet lower roller are brought in pressure contact with each other by a ring-shaped spring.

16. The apparatus of claim 9, wherein the reversing passage comprises a curved bent section having a curved concave section and a fixed guide member provided at the curved concave portion of the curved bent section.

17. The apparatus of claim 9, wherein the reversing passage comprises a curved bent section having a curved convex portion and a roller provided at the curved convex portion of the curved bent section.

* * * * *